United States Patent [19]
Falkenstein

[11] Patent Number: 5,993,278
[45] Date of Patent: Nov. 30, 1999

[54] PASSIVATION OF QUARTZ FOR HALOGEN-CONTAINING LIGHT SOURCES

[75] Inventor: Zoran Falkenstein, Los Alamos, N.Mex.

[73] Assignee: The Regents of the University of California, Los Alamos, N.Mex.

[21] Appl. No.: 09/086,996

[22] Filed: May 29, 1998

Related U.S. Application Data

[60] Provisional application No. 60/076,300, Feb. 27, 1998.
[51] Int. Cl.⁶ .................................................. H01J 9/395
[52] U.S. Cl. .............................................. 445/26; 445/42
[58] Field of Search ................................ 445/38, 40, 42, 445/26

[56] References Cited

U.S. PATENT DOCUMENTS

| | | | |
|---|---|---|---|
| 4,508,991 | 4/1985 | Wirster et al. | 313/579 |
| 4,945,290 | 7/1990 | Eliasson et al. | 315/246 |
| 5,063,030 | 11/1991 | Sweetman | 422/189 |
| 5,118,989 | 6/1992 | Egermeier et al. | 313/631 |
| 5,194,740 | 3/1993 | Kogelschatz et al. | 250/492.1 |
| 5,214,344 | 5/1993 | Kogelschatz | 313/17 |
| 5,889,367 | 3/1999 | Hofmann et al. | 313/634 |

*Primary Examiner*—Kenneth J. Ramsey
*Attorney, Agent, or Firm*—Gemma Morrison Bennett

[57] ABSTRACT

Lifetime of halogen containing VUV, UV, visible or IR light sources can be extended by passivating the quartz or glass gas containers with halogens prior to filling the quartz with the halogen and rare gas mixtures used to produce the light.

16 Claims, 5 Drawing Sheets

PASSIVATION OF QUARTZ FOR HALOGEN-CONTAINING LIGHT SOURCES

This application claims the benefit of U.S. Provisional Application Ser. No. 60/076,300, filed Feb. 27, 1998, now copending.

This invention was made with government support under Contract No. W-7405ENG-36 awarded by the U.S. Department of Energy. The government has certain rights in the invention.

TECHNICAL FIELD

This invention relates to halogen-containing light sources and more particularly to passivation of glass or quartz containers for dielectric barrier discharge light sources which employ halogens.

BACKGROUND ART

Dielectric barrier discharge light sources have been used to produce VUV, UV, visible and IR light for a great variety of purposes. For example, UV light from dielectric barrier discharge light sources has been used for photo-enhanced material deposition, photocuring of paint or lacquers, photocuring of polymers, photo-oxidation of solids, fluids or gases, or sterilization and ultraviolet oxidation of sewage, technical processing water, and drinking water.

Most dielectric barrier discharge light sources or plasma gas light sources have the plasma gas or gas from which the excimers are produced enclosed in a transparent vessel. The transparent vessel is usually glass or quartz, the purity and quality of which can vary considerably. In common arrangements, an electrode is separated by a dielectric barrier from plasma gases enclosed within a container or envelope of dielectric barrier material from a second electrode on the outer surface of the dielectric barrier containing the plasma gases. In some arrangements the electrical discharge light source is simply submersed in fluids to be treated; in other arrangements fluids to be treated with UV light have been circulated through an anulus surrounded by a dielectric barrier and an electrode.

Many light sources emitting in the VUV, UV, visible, and near IR spectral range contain halogens in the gas filling. In most cases halogens are added because the halogens either provide the desired wavelengths by molecular or atomic transitions of the halogen itself, or because the halogens provide precursers for the formation of certain species with another component of the remaining gas filling (e.g., excimers). In the latter case, the desired wavelength or wavelengths are then emitted by the energetical de-excitation of the halogen containing complex.

Because of the high chemical reactivity of halogens, in particular when the halogens are atomized in the gas discharge, the halogens interact with or adsorb onto the glass or quartz plasma gas container. This can reduce the light output, the light efficiency, and the lifetime of the light source because of loss of the halogens to chemical interactions with the container material. Also, the spectral transparency of the glass or quartz container may decrease because of changes in the chemical structure of the glass or quartz container.

Some dielectric barrier discharge light sources have been improved by varying the electrode configurations and materials used for electrodes in combination with use of relatively high gas pressures of halogens. However, the lifetime of halogen-containing dielectric barrier discharge light sources improved in this manner is relatively short at high electrical power of greater than about 1 Watt per $cm^2$ (generally less than 10 hours) at least partly because of changes in the gases contained within the quartz tubes of the UV lamp.

Because of the often expensive, labor intensive, complicated nature of the task and interruptions of operations associated with change out of no longer functioning dielectric barrier discharge light sources, it is important that the dielectric barrier discharge light sources have as long a lifetime as possible.

Therefore there is a need for ways of increasing lifetimes of any dielectric barrier discharge light source which uses halogens in the plasma gas, and in particular for ways of increasing lifetimes of dielectric barrier discharge light sources which use high gas pressures of halogens.

It is an object of this invention to provide a method of lengthening the lifetime of dielectric barrier discharge light sources which can also be employed in other halogen-containing light sources.

It is also an object of this invention to provide a method of reducing loss of halogen gases from plasma gas mixes used in dielectric barrier discharge light sources and other halogen-containing light sources.

It is another object of this invention to provide dielectric barrier discharge light sources and other halogen-containing light sources with improved lifetimes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims appended hereto are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a method for extending the lifetime of dielectric barrier discharge light sources and other halogen-containing light sources by passivating the glass or quartz plasma or excimer gas containers with halogens prior to filling the quartz with the mixture of halogen with the rare gas or gases used to produce the dielectric barrier discharge.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

BEST MODES FOR CARRYING OUT THE INVENTION

The invention passivation processes can be used to extend the lifetime and efficiency of any halogen containing light source. However, the invention passivation processes are particularly useful for improving performance of dielectric barrier discharge light sources which use halogens.

In dielectric barrier discharge light sources, high voltage is applied to an electrode which is separated by a gas gap and at least one dielectric barrier from a second electrode. Generally the spacing between the coaxial or parallel walls of a glass or quartz container form the gas gap and the walls of the container serve as the dielectric barrier between the electrodes or materials which conduct the current to or away from the outer surfaces of the quartz or glass.

Figure 1A:
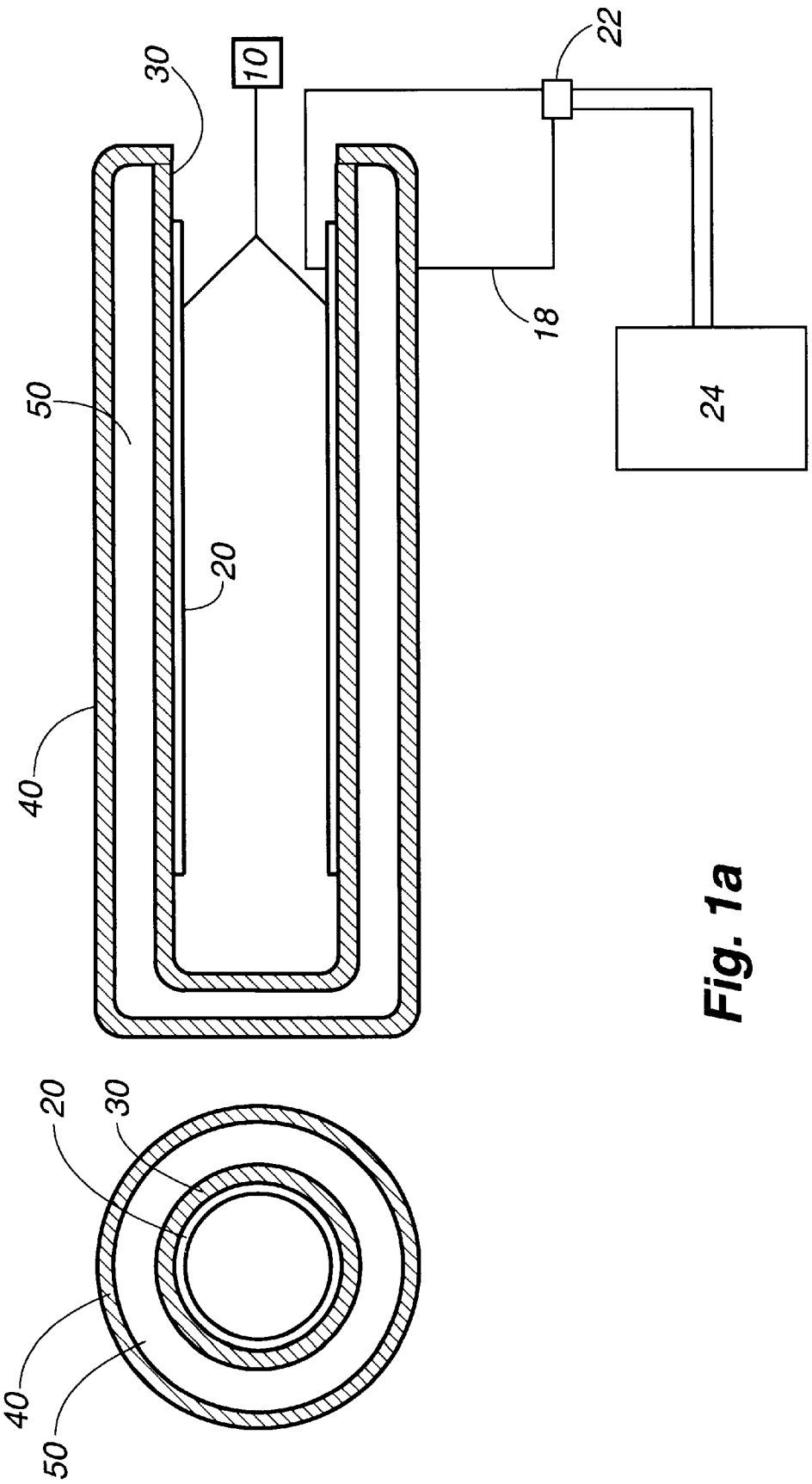
FIGS. 1a and 1b are schematic drawings of dielectric barrier discharge light sources of the sort in which the invention method may be practiced.
Figure 1B:
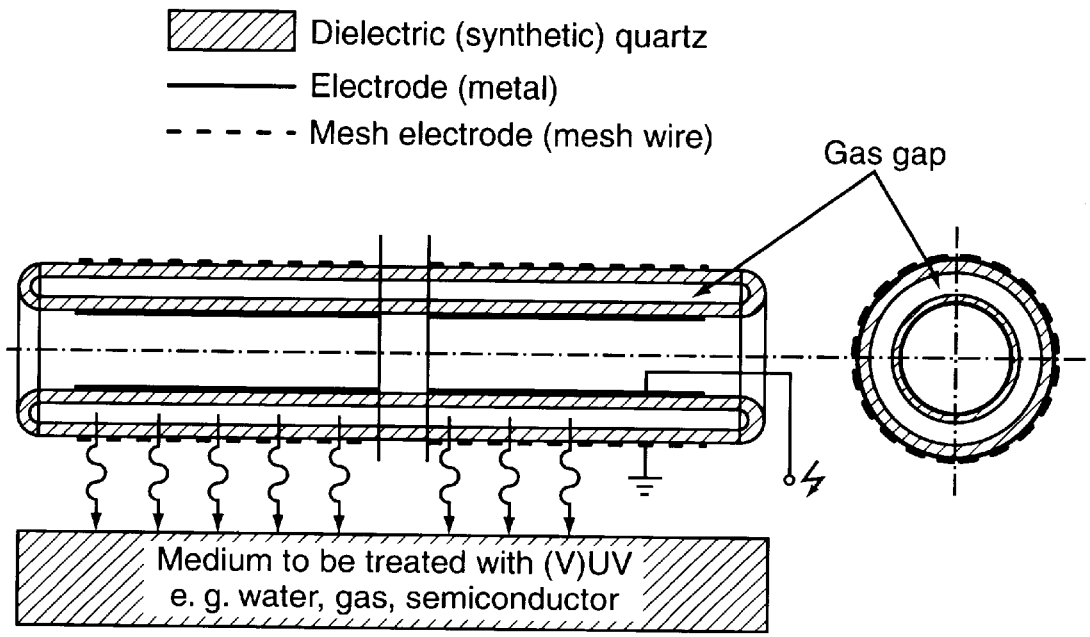
Figure 1B:
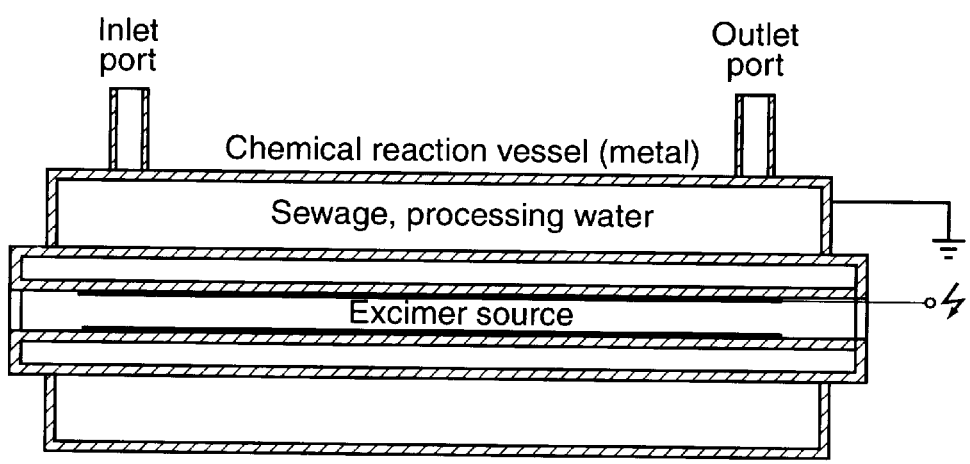

For example, one configuration of a dielectric barrier discharge UV light source as shown in FIG. 1a, comprises an inner electrode 20 placed in contact with the innermost wall of the innermost of two coaxially positioned quartz containers or tubes 30 and 40. The gas from which the plasma is formed is contained in the space or gas gap 50 between the two coaxially positioned quartz containers or tubes 30 and 40. The gas gap 50 between the quartz containers 30 and 40 is filled with a mixture of rare gas or gases and at least one halogen, depending upon the wavelength or wavelengths of light desired.

Since the photons are generated in the dielectric barrier discharge produced between the two electrodes, the collection of light from dielectric barrier discharge light sources requires that both the dielectric barrier and the ground electrode transmit light well in the whole range of spectra of light wavelengths desired. Therefore, high purity synthetic quartz or glass is generally is used as the dielectric barrier.

This arrangement results in a silent or dielectric barrier discharge. When sufficiently high voltage is applied to the innermost electrode, the mixture of rare gas or gases and halogen or halogens are electrically discharged. Excited species and ions are formed by collision of the energy-rich electrons with the background gas, followed by plasma chemical reactions in which excited dimers (excimers) are formed.

The transient discharges occur within spatially constricted sites between the quartz containers and thus are prevented from degenerating into thermal arcs, as would happen in the absence of the dielectric barrier. Because of the transient nature of the discharges, the plasma is non-thermal.

The resulting non-thermal dielectric barrier discharge produces a very distinct, almost monochromatic, output spectra with wavelengths which depend upon what gas mixtures are used. Depending upon the desired wavelength, at least one halogen is included in the gas mixture because halogens either provide the desired wavelengths by molecular or atomic transitions of the halogen itself or because the halogens provide precursers for the formation of certain species with another component of the remaining gas mixture (e.g., excimers). Due to the variety of gas mixtures which can be used in the dielectric barrier discharge light sources, wavelengths for almost the whole V/UV/visible spectra can be produced.

Because of the high chemical reactivity of halogens, in particular when atomized in the dielectric barrier discharge, there is a chemical interaction of the halogens with the material in the quartz container. This can reduce the light output, the light production efficiency, and therefore the lifetime of the light source because the plasma gas is deprived of halogens when the halogens become tied up in chemical reactions with the quartz container. Also, the spectral transparency of the quartz container may be decreased as a result of the chemical reaction of the halogens with the quartz.

The efficiency of the dielectric discharge driven excimer source is a function of the total and partial pressures of the gas components, frequency and applied voltage. The efficiency is greatly diminished and the lifetime of the dielectric barrier discharge UV light source is greatly reduced by loss of halogens from the gas gap between the quartz containers.

It has been discovered that the lifetime of dielectric barrier discharge light sources can be significantly extended by chemically passivating the quartz excimer gas containers with halogens prior to filling the quartz with the halogen and rare gas mixtures used to produce the dielectric discharge.

It is believed that the excimer or plasma gas quartz or glass containers are chemically passivated by halogen adsorption on the quartz or glass, and that possibly some of the halogen is subsequently released from the quartz or glass back into the excimer gas mixture with which the quartz or glass container is filled.

After the quartz or glass containers are cleaned and evacuated, they are passivated by filling, heating and discharging them with a selected halogen gas. Although molecular halogen gas can be used effectively in the invention process, the passivation can be enhanced by activating the electrode which is charged to provide a dielectric discharge of the halogen gas, thereby producing atomic halogen. The atomic halogen has much higher reaction rates with the quartz or glass than molecular halogen gas.

Generally, for dielectric discharge plasma light sources, a quartz or glass container with a gas gap in the range from about 0.5 mm to about 25 mm is presently preferred and presently more preferred are quartz or glass containers with gas gaps in the range from about 1 mm to about 10 mm. However, much larger containers with much larger gas gaps are suitable and can be employed for certain applications.

The selected halogen is introduced into the gas gap by any suitable means such as using a gas pumping and filling station. The halogen is allowed to remain in the gas gap under pressure for a sufficient time to allow stabilization of the pressure, indicating that the adsorption or chemical interaction is substantially complete.

A pressure sufficient to force the selected halogen to adsorb to the maximum extent practical upon the surfaces of the quartz containers in the gas gap is needed. Use of too little pressure will result in longer periods of time required to passivate the quartz surfaces. Use of too much pressure could result in increased risk of rupture of the quartz containers or simply not be as cost effective. Generally, pressures in the range from about 20 Torr to about 1,000 Torr are considered useful. Presently preferred for use in most dielectric discharge plasma light sources are pressure in the range from about 30 Torr to about 100 Torr.

When the halogen filled plasma gas container is heated to improve the effectiveness of the interaction of the halogen with the quartz or glass, temperatures in the range from ambient temperature to about 1,000° C. are considered useful. Presently preferred are temperatures in the range from about 300° C. to about 500° C.

Halogens which are useful in the practice of the invention are those which have a high vapor pressure. Generally halogens presently preferred include, but are not limited to, fluorine, chlorine, bromine and iodine. The most suitable halogen depends upon the amount of halogen to be used, because heating, discharging or otherwise energizing the halogen will increase the reaction rates of the halogen and reduce the pre-treatment time.

The halogen selected for passivation of the quartz containers must be the same as the halogen that is to be used in the gas mixture with which the gas gap is to be filled for operation of the dielectric barrier discharge light source. For example, bromine is used to passivate quartz containers which will be filled with a xenon and bromine gas mixture; chlorine is used to passivate quartz containers which will be filled with an argon and chlorine gas mixture. Many other halogen and gas mixture combinations also are useful, depending upon application and wavelengths desired.

An amount of halogen sufficient to saturate the surfaces of the quartz container is needed. The amount of halogen needed will depend upon the pressure of the halogen in the quartz container and the amount of time it is kept in the quartz container. If a quartz container is filled to a given pressure, then when the pressure has stabilized, i.e., no longer continues to drop even when it is heated and then cooled back to ambient temperature, it can generally be assumed that a sufficient amount of halogen has been used.

For example, a quartz container filled at ambient temperature to 50 Torr with bromine and allowed to approach stabilization for 2 to 3 hours may have a pressure of about 45 Torr. Then, after heating the quartz container to about 400° C., then allowing the filled quartz container to cool to ambient temperature, the bromine pressure might be about 43 Torr, showing that more bromine was driven into the quartz.

Use of too little halogen will result in loss of optimum benefit of the invention method because of lack of enough halogen to adsorb over the complete surfaces of the quartz containers. Use of too much halogen will be uneconomical and not produce further benefits.

After stabilization of the pressure, the halogen can be removed from the quartz or glass containers before filling the gas gap between the quartz containers with the excimer gas mixture. Alternatively, since the selected halogen is the same as a halogen component of the excimer gas mixture, the halogen remaining in the gas gap can be left there as additional halogen and other excimer gas components are introduced.

The following examples will demonstrate the operability of the invention.

EXAMPLE I

Figure 2:
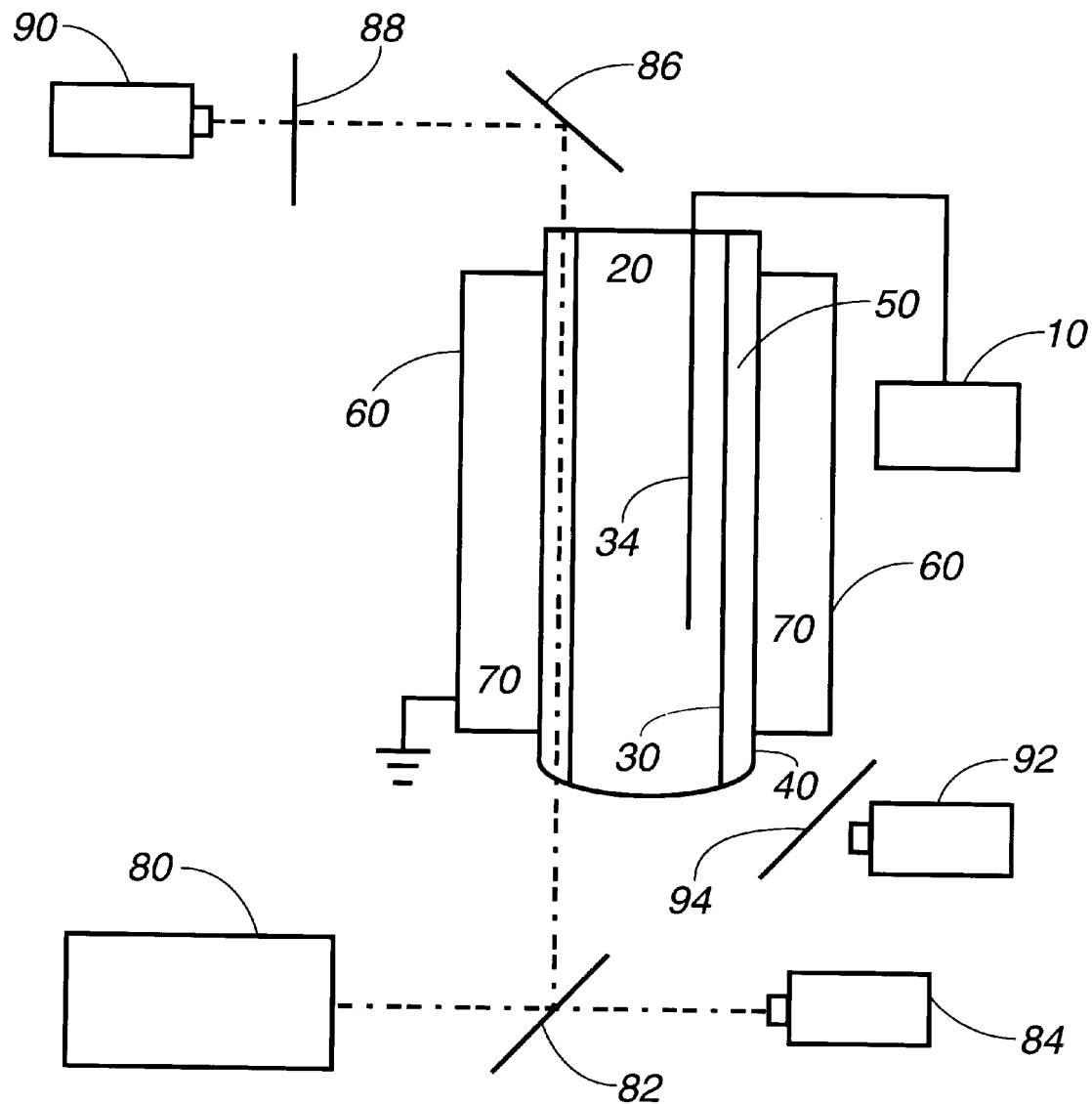
FIG. 2 is a schematic drawing of a dielectric barrier discharge light source used for testing the efficacy of the invention method.

For purposes of comparison a run was made without benefit of the invention method using a dielectric barrier discharge UV light source as described and shown in FIG. 2.

The inner electrode 20 of the dielectric barrier discharge UV light source was simply a water-filled cylindrical space within the first dielectric barrier 30. A high voltage probe 34 connected to a power source 10 was placed into contact with the water electrode 20 when it was desired to activate the inner electrode 20.

The first and second dielectric barriers 30 and 40 were quartz tubes positioned coaxially with the ends connected so as to have an enclosed airtight space or gas gap 50 between the quartz tubes. The larger outermost quartz tube 40 was 8.5 cm in diameter and 1 meter in length. The innermost smaller quartz tube 30 had dimensions which provided for a uniform 6.5 mm gas gap 50 space between the quartz tubes.

The dielectric barrier discharge UV light source was immersed in a reactor housing 60 filled with the fluid 70 to be treated. For the purposes of this test run, plain tap water was used as the fluid to be treated.

No mesh electrode was used on the outermost quartz tube. The fluid to be treated into which the dielectric barrier discharge UV light source was immersed was used as the ground electrode.

For measurement of the bromine content of the plasma gas in the gas gap 50, a tunable argon laser 80 was positioned so as to direct a beam of laser light into a beam splitter 82 which split the beam into two portions. A first portion of the beam was directed into a first diode 84 which measured the laser output as a reference signal. A second portion of the argon laser beam was directed longitudinally through the gas gap 50 into a turning mirror 86 which directed the laser light through a first interference filter 88 into a second photodiode 90. This second diode 90 measured the intensity of the laser beam that had been diminished in intensity by passing through the bromine gas. The interference filter 88 guaranteed that the diode 90 was only measuring light from the laser and not light from the room light or the XeBr* light source itself.

A third photodiode 92 and second interference filter 94 were set up to measure the UV output of the light source.

By using the fluid being treated as the outer electrode, the dielectric barrier discharge light source was liquid-cooled during its operation. Both the fluid on the inner and outer electrode were separately pumped through a heat exchanger/cooler which kept both fluids at 10° C.

The radiative lifetime of the dielectric barrier discharge UV light source was measured by measuring the UV output as a function of time.

The time the dielectric barrier discharge UV light source sustained 90% of its maximal UV radiant power output was considered the lifetime of the dielectric barrier discharge UV light source.

Figure 3:
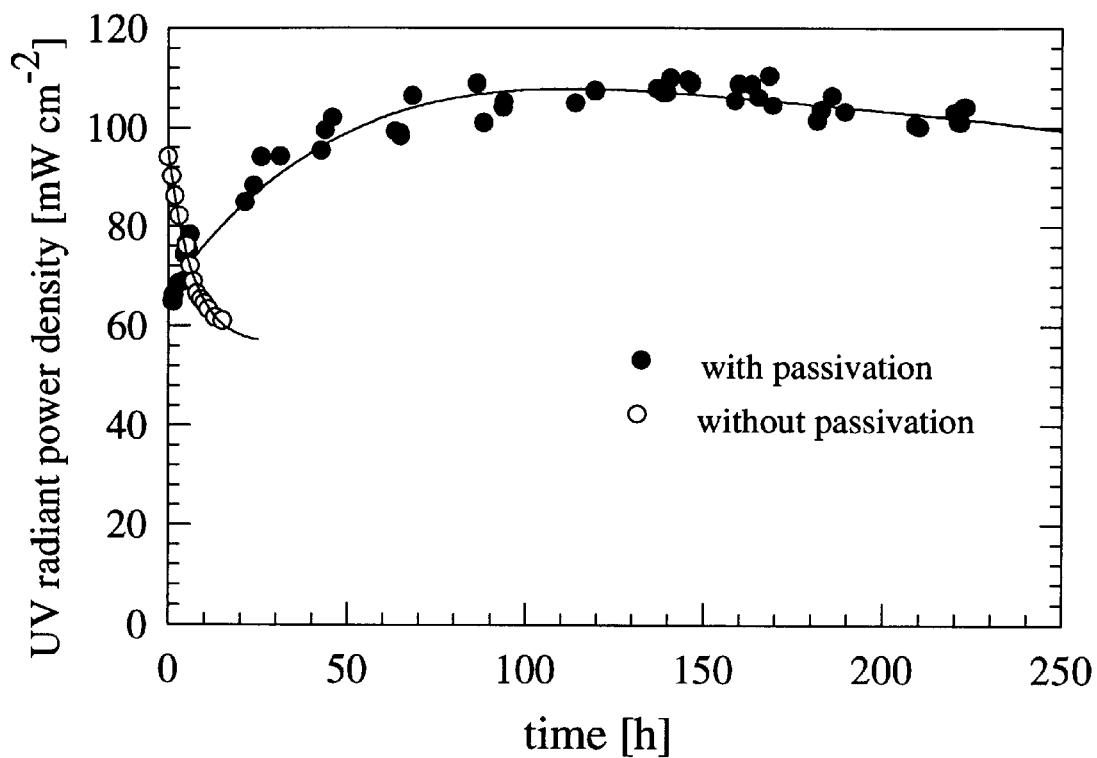
FIG. 3 is a graph of the results of a comparison run made without use of the invention method and results of an invention run made using the same equipment setup and same experimental conditions.
Figure 4:
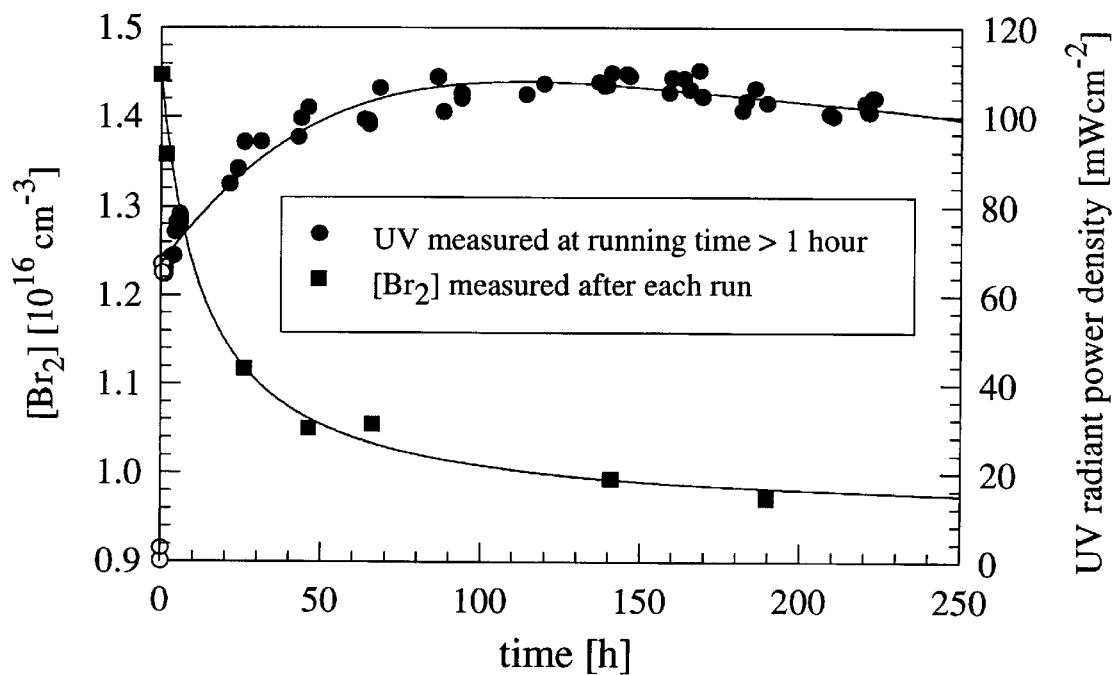
FIG. 4 is a graph of the concentration of bromine over time in the invention runs shown in FIG. 3.

Electrical power of 5 kW at 350 kHz was applied to the inner electrode 20 for the entire time shown in FIGS. 3 and 4. At intervals of about 24 hours, the UV source was turned off and the bromine concentration, electrical power and light output were measured as described above.

A UV output of greater than 100 mW/cm$^2$ was produced. UV efficiencies (including the transitions B-X, C-A, B-A) of 12% were obtained.

Results of operation of the dielectric barrier discharge light source are shown in the graph in FIG. 3, which is a plot of the emitted UV radiant power density as a function of time. Without passivating the quartz envelopes in accordance with the invention, the UV radiant power density quickly diminishes.

A rapid decay in the UV output of the UV source occurred within the first 10 hours of operation. It is believed that the decay of the UV output was due to a loss of bromine, which was lost to reaction of molecular or atomic bromine with the quartz walls of the quartz tubes. This reduces the bromine concentration in the gas, and the excimer system becomes less efficient.

The results suggest that the decrease of the UV radiant power was caused by the reduction of the amount of bromine in the plasma gas mixture. It is believed that the bromine no longer in the plasma gas mixture had diffused into the quartz walls of the gas gap or had reacted chemically as atomic bromine with the quartz.

EXAMPLE II

The same apparatus with the same temperatures, pressures, electrical power density and experimental conditions as that described in Example I were used to demonstrate the efficacy of the invention method for extending the lifetime of dielectric barrier discharge UV light sources.

The gas gap between the quartz tubes was evacuated, cleaned, heated and cooled in the same manner as described in Example I.

After cooling, the gas gap was evacuated by pumping all gases out down to a pressure of about $10^{-6}$ Torr. Then the gas gap was filled with pure bromine to a pressure of about 50 Torr. After about 2 or 3 hours the pressure had dropped to about 45 Torr, showing that bromine was reacting with the quartz wall or adsorbing onto the quartz.

This pressure of 50 Torr was maintained by continuing to introduce more bromine into the quartz envelope as needed. The bromine was allowed to react with and adsorb upon the quartz for four hours, at which time a total pressure saturation value at ambient temperature was reached.

The quartz containers and the bromine gas contained therein was heated to about 400° C. The bromine pressure dropped each time to a pressure in the range from about 40 to 45 Torr, indicating that more bromine had reacted with the quartz or adsorbed onto the quartz.

Then the bromine was pumped down to the particular pressure which would result in a mixture of 0.15% bromine in xenon when xenon was pumped in to obtain a final pressure of 125 Torr.

The UV output was measured at 24-hour intervals in the same manner described with the same apparatus described in Example I.

The results are shown in FIG. 3 where the UV output of the dielectric discharge plasma light source using the invention method is plotted on the uppermost curve.

From the graph in FIG. 3 it can be seen that the UV output increased during the first 100 hours of operation of the dielectric barrier discharge light source, reached a maximum at about 100 hours and then only slowly started to decrease. The dielectric barrier discharge light source produced UV output strong enough for industrial applications for more than 250 hours.

The radiative lifetime of the dielectric barrier discharge UV light source was measured in the same mannner described in Example I. When the invention method was used, the radiative lifetime of the dielectric barrier discharge UV light source was increased to about 750 hours.

Comparing the results from the comparison run made in Example I with the results of the invention run of Example II shown in FIG. 3, it can be seen that the UV output and lifetime of the dielectric barrier discharge light source is significantly increased when the invention passivation process is used.

In this example, with the invention passivation process, the bromine concentrations in the plasma gas gap were determined by measurement of absorption of light at 457 nm from the argon laser by the bromine in the gas filling. The discharge was turned off for about 10 minutes and the signal from the argon laser was measured. Then the discharge was turned on and the process was repeated about every 24 hours.

Absorption measurements of bromine in the gas gap of the dielectric barrier discharge UV light source confirmed that the initial bromine content was about 50% higher than the optimal concentration than the final bromine content.

The strongest UV output was obtained at a bromine concentration of about $1 \cdot 10^{16}$ cm$^{-3}$.

Changes in bromine content of the plasma gas in this invention example are plotted as a function of time of operation of the dielectric barrier discharge light source in the graph of FIG. 4. In FIG. 4, it can be seen that the bromine concentration dropped from the beginning of the running of the dielectric barrier discharge light source.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

INDUSTRIAL APPLICABILITY

The efficiency and lifetime of any light source which uses one or more halogens, and in particular, any dielectric discharge barrier light source which uses one or more halogens in the plasma gas mixture can be significantly increased using the invention passivation processes.

What is claimed is:

1. A method of improving performance of dielectric barrier discharge light sources which use gas mixtures containing one or more halogens in a quartz or glass plasma gas container comprising:
    (a) evacuating said plasma gas container; thereafter,
    (b) filling said plasma gas container with at least one halogen which is the same as at least one of the halogens which is to be used in the plasma gas mixture; thereafter,
    (c) allowing said at least one halogen to remain in said plasma gas container for a period of time sufficient to allow the pressure of said at least one halogen to stabilize; thereafter,
    (d) filling said plasma gas container with a plasma gas mixture.

2. A method as recited in claim 1 wherein said at least one halogen is removed from said plasma gas container after step (c) but before filling said plasma gas container with said plasma gas mixture.

3. A method as recited in claim 1 wherein said plasma gas mixture is added without first removing said at least one halogen from said plasma gas container.

4. A method as recited in claim 1 wherein high voltage is applied to an electrode in contact with said plasma gas container while said at least one halogen is contained therein.

5. A method as recited in claim 1 wherein said plasma gas container is filled with said at least one halogen at a pressure in the range from about 20 Torr to about 1,000 Torr.

6. A method as recited in claim 1 wherein said plasma gas container is filled with said at least one halogen at a pressure in the range from about 30 Torr to about 100 Torr.

7. A method as recited in claim 1 wherein said plasma gas container is heated to a temperature in the range from ambient temperature to about 1,000° C. while said plasma gas container is filled with said at least one halogen.

8. A method as recited in claim 1 wherein said plasma gas container is heated to a temperature in the range from about 300° C. to about 500° C. while said plasma gas container is filled with said at least one halogen.

9. A method as recited in claim 1 wherein said plasma gas container has a gas gap in the range from about 0.5 mm to about 25 mm.

10. A method as recited in claim 1 wherein said at least one halogen is bromine and said plasma gas mixture comprises bromine and xenon.

11. A method as recited in claim 1 wherein said at least one halogen is chlorine and said plasma gas mixture comprises chlorine and argon.

12. A method as recited in claim 1 wherein said plasma gas container is filled with at least one halogen at a pressure in the range from about 20 Torr to about 1,000 Torr; said plasma gas container is heated to a temperature in the range from ambient temperature to about 1,000° C. while said plasma gas container is filled with said at least one halogen; and said plasma gas container has a gas gap in the range from about 0.5 mm to about 25 mm.

13. A method as recited in claim 1 wherein said plasma gas container is filled with at least one halogen at a pressure in the range from about 30 Torr to about 100 Torr; said plasma gas container is heated to a temperature in the range from about 300° C. temperature to about 500° C. while said plasma gas container is filled with said at least one halogen; and said plasma gas container has a gas gap in the range from about 4 mm to about 10 mm.

14. A method as recited in claim 13 wherein high voltage is applied to an electrode in contact with said plasma gas container while said plasma gas container is filled with said at least one halogen.

15. A method as recited in claim 13 wherein said at least one halogen is bromine and said plasma gas mixture comprises bromine and xenon.

16. A method as recited in claim 13 wherein said at least one halogen is chlorine and said plasma gas mixture comprises chlorine and argon.

* * * * *